United States Patent [19]

Moreno

[11] 4,190,325
[45] Feb. 26, 1980

[54] THERMAL COMPENSATOR ASSEMBLY
[75] Inventor: Isabel L. Moreno, Oceanside, Calif.
[73] Assignee: Ford Motor Company, Dearborn, Mich.
[21] Appl. No.: 960,155
[22] Filed: Nov. 13, 1978

Related U.S. Application Data

[63] Continuation-in-part of Ser. No. 856,699, Dec. 2, 1977.
[51] Int. Cl.$^2$ .............................................. G02B 7/02
[52] U.S. Cl. ................................................... 350/253
[58] Field of Search ................................ 350/252, 253
[56] References Cited

U.S. PATENT DOCUMENTS 3,612,664  10/1971  Berman ................................ 350/253
4,116,537  9/1978   Dilworth ............................. 350/253

Primary Examiner—F. L. Evans
Attorney, Agent, or Firm—Paul K. Godwin, Jr.; Clifford L. Sadler

[57] ABSTRACT

A thermal compensator assembly employed in an optical system to adjust the relative location of lens elements and maintain a preset focus as the ambient temperature changes. The assembly includes a plurality of high linear coefficient of expansion push rods interconnected with levers having relatively low linear coefficients of expansion. The assembly changes in length in direct response to ambient temperature changes. A second lens barrel carrying the objective lens is bias mounted for floating movement with respect to the first lens barrel so as to abut the assembly. The compensator assembly is exemplified as being pin mounted on a first relatively fixed lens barrel. The assembly expands and contracts as a function of ambient temperature to effect movement of the floating lens barrel.

7 Claims, 2 Drawing Figures

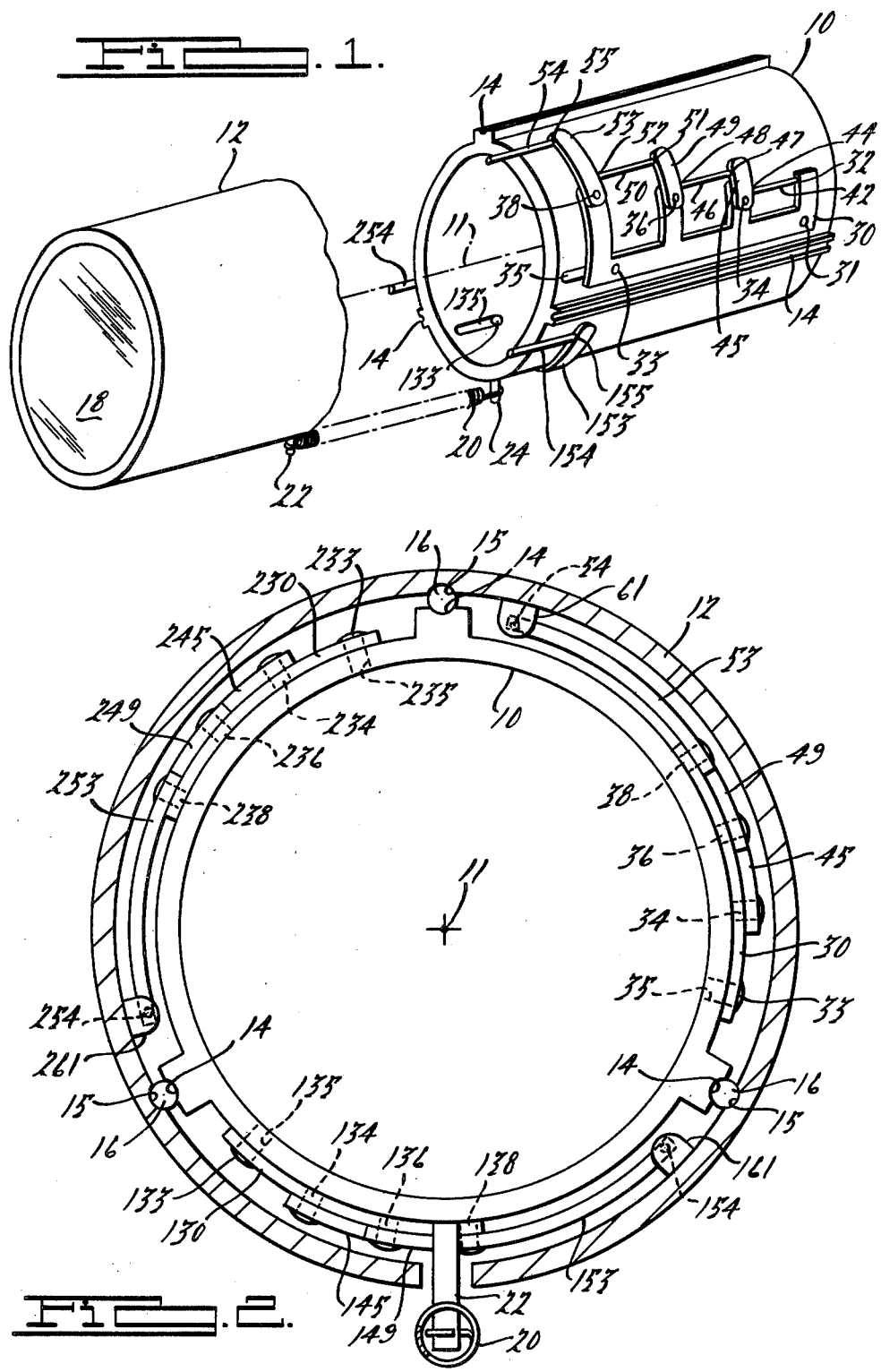

THERMAL COMPENSATOR ASSEMBLY

CROSS REFERENCE TO RELATED APPLICATIONS

This application is a Continuation-In-Part of copending U.S. patent application Ser. No. 856,699, filed Dec. 2, 1977, entitled THERMAL COMPENSATOR LINKAGE, and is related to copending U.S. patent application Ser. No. 860,345, filed Dec. 14, 1977, entitled THERMAL COMPENSATOR ASSEMBLY, which is also a Continuation-In-Part of U.S. patent application Ser. No. 856,699.

BACKGROUND OF THE INVENTION

1. Field of the Invention:

The present invention relates to a mechanical assembly which provides linear movement in response to temperature changes. More specifically, the present invention relates to improvements in thermal compensator mechanisms as employed in optical systems.

2. Description of the Prior Art:

The problem of focus distortion in optical systems due to changes in temperature has been frequently discussed in the prior art. Generally, temperature variations cause glass lenses to expand or contract and therefore vary the indices thereof. The lens mounts also tend to expand or contract due to changes in temperature and additionally affect the focal point. In order to maintain a fixed focal point throughout wide variations in temperature, many systems have been developed for compensating the above mentioned expansion and contraction.

In U.S. Pat. No. 1,325,936, compensation was achieved between two lenses by mounting each lens in separate mounting barrels and connecting the barrels at a point removed from the lenses. The two barrels were made of materials having different thermal coefficients of expansion, so that any change in temperature resulted in a separation change between the lenses corresponding to the difference between the two barrel expansions or contractions.

In U.S. Pat. No. 2,533,478, compensation was achieved by mounting the lenses in a barrel having a relatively low thermal coefficient of expansion and connecting one end of the lens barrel to an expandable sleeve having a relatively high thermal coefficient of expansion. The other end of the expandable sleeve was connected to an outer support sleeve having a relatively low thermal coefficient of expansion.

In U.S. Pat. No. 2,537,900, compensation was achieved by mounting the lenses in a barrel having a relatively low thermal coefficient of expansion and connecting one end of the lens barrel to a camera body. The camera body had a relatively high thermal coefficient of expansion to vary the position of the focal point in compensating fashion to maintain the preset focus.

My parent copending U.S. patent application Ser. No. 856,699, cited above, employs a linearly expanding and contracting compensator linkage constructed of elongated link elements having alternately dissimilar linear coefficients of expansion. The link elements are adjacently arranged in link pairs and the links in each pair are joined at a first end so to appear folded. Each link pair includes a first link element having a relatively high linear coefficient of expansion and a second link element having a relatively low linear coefficient of expansion so that the resultant movement of one end of the link pair is due to the difference between coefficients of expansion and the amount of movement of each preceding link member.

My related copending U.S. patent application Ser. No. 860,345, cited above, employs a serpentine channel having several elongated channel portions running parallel to the optic axis. The serpentine channel is formed in a relatively fixed lens barrel having a relatively high linear coefficient of expansion. A floating lens barrel is thermally compensated by a series of balls having a relatively low linear coefficient of expansion located in the serpentine channel. When the serpentine channel linearly expands with the expanding fixed lens barrel, the balls relocate along the channel due to biasing of the floating lens barrel in contact with the balls.

SUMMARY OF THE INVENTION

The present invention overcomes the basic size restriction problem inherent in the prior art, as well as offering an alternative to the compensator linkage disclosed and claimed in my aforementioned earlier filed applications.

Large compensational adjustments are obtainable with the present invention to account for changes in the ambient temperature and the resultant changes in the optical system. A unique linkage is employed for amplifying the predicted temperature length changes occurring in individual link elements and adjusting the relative distance between a lens element in a floating lens holding barrel and the lenses in a first relatively fixed barrel by an amount sufficient to maintain a preset system focus. Amplification is achieved in each link by an expandable push rod connected between a reference and a pivoted lever mounted on the outer surface of the first lens barrel. The expandable push rod abuts a point on the pivoted lever to effect a mechanical advantage between the expansion movement of the push rod and the movement of the other end of the pivoted lever, resulting in the push rod movement being amplified. A series of links, wherein a push rod of each link abuts the movable end of the lever of the immediately preceding link and the intermediate point of its associated lever, are serially arranged in order to multiply the mechanical advantage of each individual link and effect a relatively large compensational adjustment of the floating lens barrel with a relatively short linkage assembly.

It is an object of the present invention to provide a lightweight thermal compensator assembly.

It is another object of the present invention to provide a compact thermal compensator assembly suitable for use in optical systems.

It is a further object of the present invention to provide a thermal compensator assembly which employs a mechanical amplification technique to provide compensational movement of a lens element to maintain a preset focus as ambient temperature changes.

BRIEF DESCRIPTION OF THE DRAWINGS

FIG. 1 is an illustration of an embodiment of the present invention.

FIG. 2 is a cross-sectional view of the assembled embodiment shown in FIG. 1.

DESCRIPTION OF THE PREFERRED EMBODIMENT

The embodiment of the present invention is shown in FIGS. 1 and 2, employed in an optical lens system. A first relatively fixed lens holding barrel 10 is shown as being concentric within an outer, relatively movable objective lens holding barrel 12. Generally, the first lens holding barrel 10 is rigidly mounted to a support mechanism of a telescope or other optical device and is constructed of a lightweight material having a relatively high linear coefficient of expansion, such as aluminum or magnesium.

The outer lens holding barrel 12 contains a lens element 18 and is supported for movement with respect to the first lens holding barrel 10 by a plurality of ball bearing assemblies. Each ball bearing assembly includes a groove 14 which extends linearly along the outer surface of the lens barrel 10 parallel to an optical axis 11. Corresponding grooves 15 on the inner surface of the outer barrel 12 provide bearing surfaces for roller bearings 16 mounted therein.

The thermal compensator assembly is mounted for independent movement on lens barrel 10 so as not to be influenced by thermal expansion in the lens barrel 10. An elongated support member 30 having a relatively low linear coefficient of expansion, such as Kovar or Invar, is connected to the lens barrel 10 by a pin 31. The lens barrel 10 contains a linear groove 35 which extends longitudinally therein in a direction parallel to the optic axis 11. A pin 33 extends from the elongated support member 30 into the groove 35. Therefore, when the lens barrel 10 either expands or contracts longitudinally, such movement does not effect the support member 30.

A first push rod 42 having a relatively high linear coefficient of expansion, such as aluminum, is mounted on the elongated support member 30 in a socket 32. The push rod 42 is mounted so as to expand and contract linearly along a line parallel to the optic axis 11. A first lever element 45 having a relatively low linear coefficient of expansion, such as Kovar or Invar, is pivotally mounted at a first end 34 to the elongated support member 30 and abutted by a second end 44 of the first push rod 42. Expansion of the push rod 42 causes the second end 47 of lever 45 to move in a direction generally parallel to the optic axis. It is understood that the second end 47 moves in an arc segment; however, due to the rather limited distance involved, that movement is considered to be generally parallel to the optic axis 11. In the preferred embodiment, the second end 44 of the first push rod 42 abuts an intermediate point on the first lever 45 to provide a mechanical advantage of 3:1. This abutment is maintained by a biasing compression force on the assembly and a small socket at the intermediate point that mates with the push rod. Such location means that the second end 47 of the lever 45 moves a distance which is three times greater than the excursion of the second end 44 of the push rod 42. The first push rod 42, in combination with the first lever 45, forms a first link in the assembly linkage. That link could be serially combined with similar links to provide a desired amount of movement of the floating lens barrel 12 in response to ambient temperature changes. The embodiment of FIGS. 1 and 2 is shown to include a series of links.

A second link comprises a second push rod 46 and a second lever 49 between the first link and a third link. The second push rod 46 abuts between the second end 47 of the first lever and an intermediate point 48 on the second lever 49. The first end of the second lever 49 is connected to the support member 30 by a pin 36 for pivotal rotation. A third link is shown including a third push rod 50, which abuts between the second end 51 of the second lever 49 and an intermediate point 52 on its associated third lever 53.

A fourth push rod 54 is shown abutting between the second end 55 of the third lever 53 and a tab 61 which extends radially from inside the lens barrel 12.

A biasing spring 20 is connected between a post 22 extending from the floating lens barrel 12 and a pin 24 extending from the lens barrel 10. The biasing spring 20 tends to hold the lens barrel 12 against the optical compensator assembly and retract the lever movements when the push rods contract due to lowering the ambient temperature.

Second and third compensator assemblies are shown evenly placed around the lens barrel 10. Elements of those assemblies are identical to those shown in the first optical compensator described above and identical shown elements have character numerals respectively prefaced with "1" and "2".

The combination of three optical compensators shown in FIGS. 1 and 2 therefore provide balanced pressures to effect a smooth and continuous movement of the lens barrel 12 when such compensation is necessary.

As mentioned above, the disclosed embodiment employs linkages which each exhibit a 3:1 mechanical advantage with respect to the amount of linear excursion of the associated push rod. Based upon that known mechanical advantage, the amount of total excursion is predicted, since it is related to the number of links in the linkage and the amount of excursion contributed by each link. For example, where an assembly includes "n" push rods (where n is an integer greater than or equal to 1) and "n-1" levers, each link, such as that assembly shown in FIGS. 1 and 2, amplifies its associated push rod excursion by a factor of 3, the total excursion is:

$$\Delta d = 3^{n-1}d_1 + 3^{n-2}d_2 + 3^{n-3}d_3 + 3^{n-4}\Delta d_4 + \ldots + 3^{n-n}\Delta d_n$$

It can therefore been seen from the above relationship that the first link formed by a push rod 42 and lever 45 combine to move the second end 47 of the lever 45 by an amount equal to three times $\Delta d_1$, where $\Delta d_1$ is the amount of excursion attributed to push rod 42. However, with three links and one additional push rod, the total excursion would be;

$$\Delta d = 27\Delta d_1 + 9\Delta d_2 + 3\Delta d_3 + \Delta d_4,$$

where $\Delta d_4$ indicates the amount of unamplified excursion contributed by the thermal expansion in push rod 54.

In the event that it is desirable to move the floating lens barrel 12 in a direction opposite to the thermal expansion of the lens barrel 10, it is readily apparent that the linkage and biasing may be reversed in order to effect such movement. Furthermore, it is apparent that the assemblies may be mounted on a focusing mechanism which controls selectable movement of the objective, rather than the first lens barrel, as shown.

In addition to the above described embodiment, it will be apparent that many modifications and variations may be effected without department from the scope of the novel concept of this invention. Therefore, it is intended by the apended claims to cover all such modifications and variations which fall within the true spirit and scope of the invention.

It is claimed:

1. In an optical system comprising:
   a first lens barrel supporting at least one lens element along an optical axis;
   a second lens barrel supporting a second lens element, wherein said second lens barrel is float mounted on said first lens barrel for adjustable movement along said optic axis with respect to said first lens barrel;
   an improved optical compensator assembly comprising:
   an elongated support member, having a relatively low linear coefficient of expansion, connected to said first lens barrel at a single point so as not to restrict thermal expansion and contraction of said first lens barrel in response to ambient temperature changes;
   a first lever having a relatively low linear coefficient of expansion, one end pivotally mounted on said support member and a second end located for movement along an arc segment generally parallel to said optic axis; and
   a first push rod having a relatively high linear coefficient of expansion, having a first end abutting against said support member and a second end abutting an intermediate point between said ends of said first lever, wherein;
   said second end of said first lever member communicates with said floating lens barrel to effect movement thereof greater than the linear expansion of said first push rod.

2. An improved optical compensator assembly as in claim 1, wherein said intermediate point on said lever is located less than half the distance from said first end to said second end of said lever to thereby result in an amplified movement of said second end of said lever with respect to the linear expansion movement of said first push rod.

3. An improved optical compensator assembly as in claim 1, wherein said floating lens barrel is biased towards said first lever to effect movement thereof in response to linear contraction of said first push rod.

4. An improved optical compensator as in claim 1, wherein said first lever and said first push rod form a first link and said assembly comprises a plurality of similar links serially abutting between said first link and said floating lens barrel, wherein the first end of each link push rod abuts the second end of the immediately preceding link lever.

5. An improved optical compensator as in claim 4, wherein said second end of each of said link push rods abuts an intermediate point on its associated link lever in order to produce an amplified movement of said second end of that associated lever with respect to the linear expansion of that push rod combined with the movement of the second end of the immediately preceding link lever.

6. An improved optical compensator as in claim 5, wherein said intermediate point on each link lever is located half of the distance from said first end to said second end of said lever to thereby effect an amplified movement of said second end of said lever with respect to the movement of said associated push rod.

7. An improved optical compensator assembly as in claim 4, wherein the first end of each lever in said plurality of said links is pivotally mounted on said support member.

* * * * *

UNITED STATES PATENT AND TRADEMARK OFFICE
CERTIFICATE OF CORRECTION

PATENT NO. : 4,190,325
DATED : February 26, 1980
INVENTOR(S) : Isabel L. Moreno

It is certified that error appears in the above—identified patent and that said Letters Patent is hereby corrected as shown below:

Column 4, lines 38 and 39, cancel

"$\Delta d = 3^{n-1} d_1 + 3^{n-2} d_2 + 3^{n-3} d_3 + 3^{n-4} \Delta d_4 + \ldots + 3^{n-n} \Delta d_n$"

and substitute

-- $\Delta d = 3^{n-1} \Delta d_1 + 3^{n-2} \Delta d_2 + 3^{n-3} \Delta d_3 + 3^{n-4} \Delta d_4 + \ldots + 3^{n-n} \Delta d_n$ --

Signed and Sealed this

Twenty-fifth Day of November 1980

[SEAL]

*Attest:*

SIDNEY A. DIAMOND

*Attesting Officer*   Commissioner of Patents and Trademarks

UNITED STATES PATENT AND TRADEMARK OFFICE
CERTIFICATE OF CORRECTION

PATENT NO. : 4,190,325
DATED : February 26, 1980
INVENTOR(S) : Isabel L. Moreno

It is certified that error appears in the above-identified patent and that said Letters Patent are hereby corrected as shown below:

On the title page, Item [73],
Assignee designation cancel "Ford Motor Company" and substitute -- Ford Aerospace & Communications Corporation --.

Signed and Sealed this

Tenth Day of August 1982

[SEAL]

Attest:

GERALD J. MOSSINGHOFF

*Attesting Officer*  *Commissioner of Patents and Trademarks*